United States Patent
Joong et al.

(10) Patent No.: US 6,188,887 B1
(45) Date of Patent: *Feb. 13, 2001

(54) DISTRIBUTED DATA STORAGE AND DELIVERY IN A CELLULAR TELEPHONE NETWORK

(75) Inventors: Donald Joong; Nikos Katinakis, both of Montreal; Akbar Rahman, Ottawa, all of (CA)

(73) Assignee: Telefonaktiebolaget LM Ericsson (publ) (SE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/979,246

(22) Filed: Nov. 26, 1997

(51) Int. Cl.[7] .................. H04M 3/42; H04Q 7/22
(52) U.S. Cl. ............ 455/417; 455/414; 455/412; 455/466
(58) Field of Search .................. 455/466, 413, 455/417, 414, 412, 433, 432, 428, 425

(56) References Cited

U.S. PATENT DOCUMENTS

| | | | |
|---|---|---|---|
| 4,759,056 | 7/1988 | Akiyama | 379/197 |
| 5,251,248 | 10/1993 | Tokunaga et al. | 455/461 |
| 5,274,845 | 12/1993 | Wang | 455/461 |
| 5,329,578 | 7/1994 | Brennan et al. | 379/88.19 |
| 5,440,541 | 8/1995 | Iida et al. | 370/352 |
| 5,493,607 | 2/1996 | Arumainayagam et al. | 379/88.18 |
| 5,497,412 * | 3/1996 | Lannen et al. | 455/432 |
| 5,504,804 * | 4/1996 | Widmark et al. | 455/433 |
| 5,506,887 | 4/1996 | Emery et al. | 455/461 |
| 5,627,877 * | 5/1997 | Penttonen | 455/413 |
| 5,678,179 * | 10/1997 | Turcotte et al. | 455/466 |
| 5,793,762 * | 8/1998 | Penners et al. | 455/439 |
| 5,878,347 * | 3/1999 | Joensuu et al. | 455/466 |
| 5,889,839 * | 3/1999 | Beyda et al. | 455/412 |
| 5,930,699 * | 7/1999 | Bhatia | 4585/414 |
| 5,950,123 * | 9/1999 | Schwelb et al. | 455/414 |
| 5,953,662 * | 9/1999 | Lindquist et al. | 455/433 |

FOREIGN PATENT DOCUMENTS

| | | |
|---|---|---|
| 1318036 | 5/1993 | (CA) . |
| 2154089 | 1/1996 | (CA) . |
| 0 682 457 | 5/1995 | (EP) . |
| 0 820 181 | 7/1997 | (EP) . |
| WO 97/11564 | 7/1996 | (WO) . |
| 97/12469 | 4/1997 | (WO) . |

OTHER PUBLICATIONS

PCT International Search Report, Feb. 17, 1999, PCT/SE 98/02132.

* cited by examiner

Primary Examiner—Reinhard J. Eisenzopf
Assistant Examiner—Eliseo Ramos-Feliciano
(74) Attorney, Agent, or Firm—Jenkens & Gilchrist

(57) ABSTRACT

Procedures are disclosed for supporting roaming subscriber mobile station access to stored subscriber data messages. In one aspect, a received subscriber data message is routed for storage and subsequent forwarding/retrieval, not to a "home" message center, but instead to a message center either optimally positioned with respect to a current known location of the subscriber mobile station or associated with an initially receiving mobile switching center. In another aspect, a mailbox established for a given subscriber mobile station in the home message center is transferred (perhaps on a periodic basis) for storage in a local mailbox of a proximate message center within a cellular telephone network where the subscriber is currently roaming. In either case, the storing message center thereafter performs any requisite operations needed to facilitate message forwarding to or retrieval by the addressee subscriber mobile station.

36 Claims, 3 Drawing Sheets

DISTRIBUTED DATA STORAGE AND DELIVERY IN A CELLULAR TELEPHONE NETWORK

BACKGROUND OF THE INVENTION

1. Technical Field of the Invention

The present invention relates to cellular telephone networks and, in particular, to the distributed storage and delivery of data associated with cellular telephone network supported subscriber data services (such as short message, facsimile, voice mail and electronic mail delivery).

2. Description of Related Art

Reference is now made to FIG. 1 wherein there is shown a block diagram of a conventional digital cellular telephone network 10. The network 10 supports one or more subscriber data services (such as short message, facsimile, voice mail and electronic mail delivery) for use by subscribers in conjunction with their conventional cellular telephone service. The purpose of the subscriber data services is to provide a means for transferring subscriber data messages between message entities (MEs) 12 using the communications environment provided by the cellular telephone network 10.

The message entities 12 participating in the subscriber data service comprise data terminals (DTs) 14 connected to the fixed telephone network 16 (comprising a public switched telephone network (PSTN) or other equivalent/similar telephone network). The message entities 12 further comprise the subscriber mobile stations (MS) 18 operating within the cellular telephone network 10. Subscriber data messages must originate with or terminate at one of the subscriber mobile stations 18.

Multiple message centers (MC) 20 are provided and connected to the fixed telephone network 16 and to the cellular telephone network 10. Each message center 20 is a multi-media platform that functions as a store and forward/retrieve center for receiving and delivering subscriber data messages between the message entities 12. When a subscriber data message is originated, it is first sent to a message center 20 associated with that addressor subscriber. The message is then forwarded to another message center 20 associated with the addressee subscriber. At that point, the message is then delivered to (for example, forwarded to or retrieved by) the addressee message entity at an appropriate time.

The cellular telephone network 10 further includes a plurality of base stations 24 for effectuating radio frequency communications over an air interface 26 with the mobile stations 18. Each base station 24 is connected to a mobile switching center (MSC) 30. The mobile switching center 30 operates to control base station 24 operation, maintain a record (in a home location register 42 and a visitor location register—not shown) of mobile station 18 operating parameters and location within the network 10 and switch, either within the network 10 or with the fixed telephone network 16, those cellular telephone calls originated by or terminated at the mobile stations 18. The mobile switching centers 30 are further connected to the message centers 20 used in providing the subscriber data services.

A mobile station 18 is typically assigned a "home" message center 20 in much the same way that the mobile station is assigned a home location register 42. It is in this message center 20 that a mailbox 46 assigned to the given mobile station is maintained. Any subscriber data message intended for delivery to that given mobile station 18 passes through, for store and forward/retrieve delivery, the mailbox 46 assigned to and maintained in the associated home message center 20 for that given mobile station. Inefficiencies with this "home" message center 20 based network architecture and topology, however, often arise in connection with roaming mobile stations 18.

First, with respect to message center 20 store and forward operation, all subscriber data messages are initially stored in the home message center (of a home service area within the cellular telephone network 10$h$) for the addressee roaming subscriber mobile station 18. This message center 20 then must query the home location register 42 for that subscriber mobile station 18 in order to obtain location information, and then attempt to forward the subscriber data message over the network 10 to the roaming subscriber mobile station in a visited service area within the cellular telephone network 10$v$. Due to latency in updating the location information, or the mobile station being in inactive mode, or congestion in the network or air interface, forwarding of the subscriber data message may fail. Failure of the message forwarding operation results in a waste of valuable network communications resources and added user/service provider costs. This is especially a problem with subscriber data messages (such as facsimile, voice or the like) which require the establishment of a circuit connection to effectuate delivery.

Second, with respect to message center 20 store and retrieve operation, all subscriber data messages are again initially stored in the home message center (of a home service area within the cellular telephone network 10$h$) for the addressee roaming/moving subscriber mobile station 18. This message center 20 then must then be queried by the roaming subscriber mobile station 18 from the visited service area within the cellular telephone network 10$v$ to collect the stored messages. When roaming, in particular, this querying operation to retrieve messages can be costly and inefficient. This is especially a problem with subscriber data messages (such as facsimile, voice or the like) which require the establishment of a circuit connection to effectuate delivery.

What is needed then is a more efficient network architecture and topology for handling stored subscriber data message delivery (either forwarding or retrieval) to roaming/moving subscriber mobile stations.

SUMMARY OF THE INVENTION

In a first embodiment of the present invention, the prior art "home" message center network architecture and topology is abandoned in favor of a distributed message center network architecture and topology. In this distributed architecture and topology, a received subscriber data message is routed for storage and subsequent forwarding, not to a "home" message center conventionally provided for an addressee subscriber mobile station, but instead to a message center optimally positioned with respect to the subscriber mobile station or associated with an initially receiving mobile switching center. That optimally positioned message center is identified by querying the home location register for the addressee subscriber mobile station and processing current location information. Following receipt of the subscriber data message, the storing message center performs any requisite operations needed to facilitate message forwarding to the addressee subscriber mobile station.

In a second embodiment of the present invention, a mailbox established for a given subscriber mobile station in the home message center is given an optional portability characteristic implemented when the owning subscriber mobile station is roaming. In such cases, the roaming subscriber mobile station may instruct the establishment of a local mailbox in a proximate message center. The contents (subscriber data messages) of the mailbox maintained in the home message center are then transferred (perhaps additionally on a periodic basis) to the local mailbox. Responsive to any subscriber data messages sent to the mailbox in the home message center thereafter, a notification is then instead given to the addressor of the subscriber data message to make a storage of the message in the local mailbox of the proximate message center. Delivery of the subscriber data messages is then effectuated (through either forwarding or retrieval) by the proximate message center.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

1. Distributed Architecture and Topology

Figure 1:
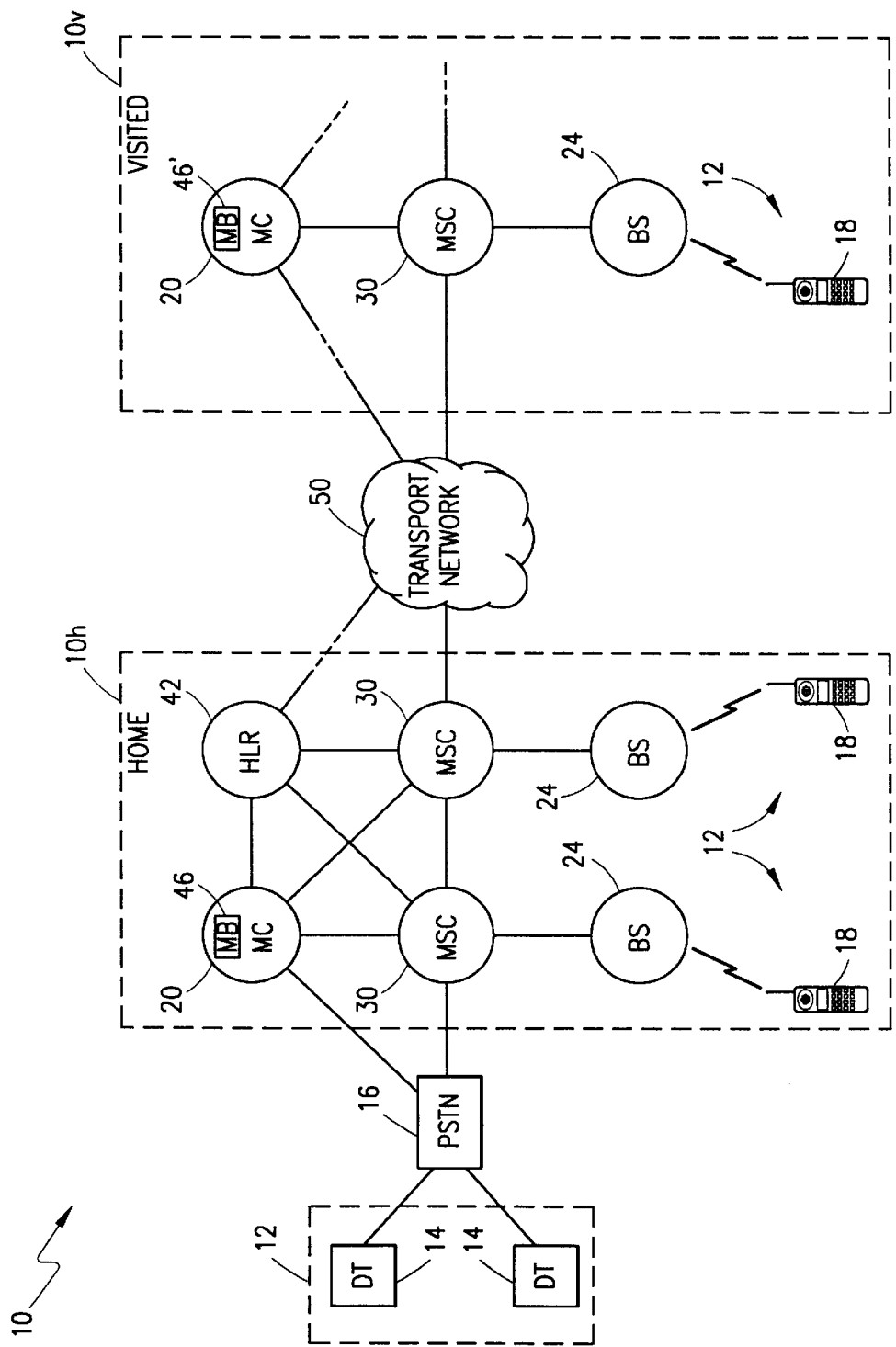
FIG. 1, previously described in part, is a block diagram of a cellular telephone network.
Figure 2:
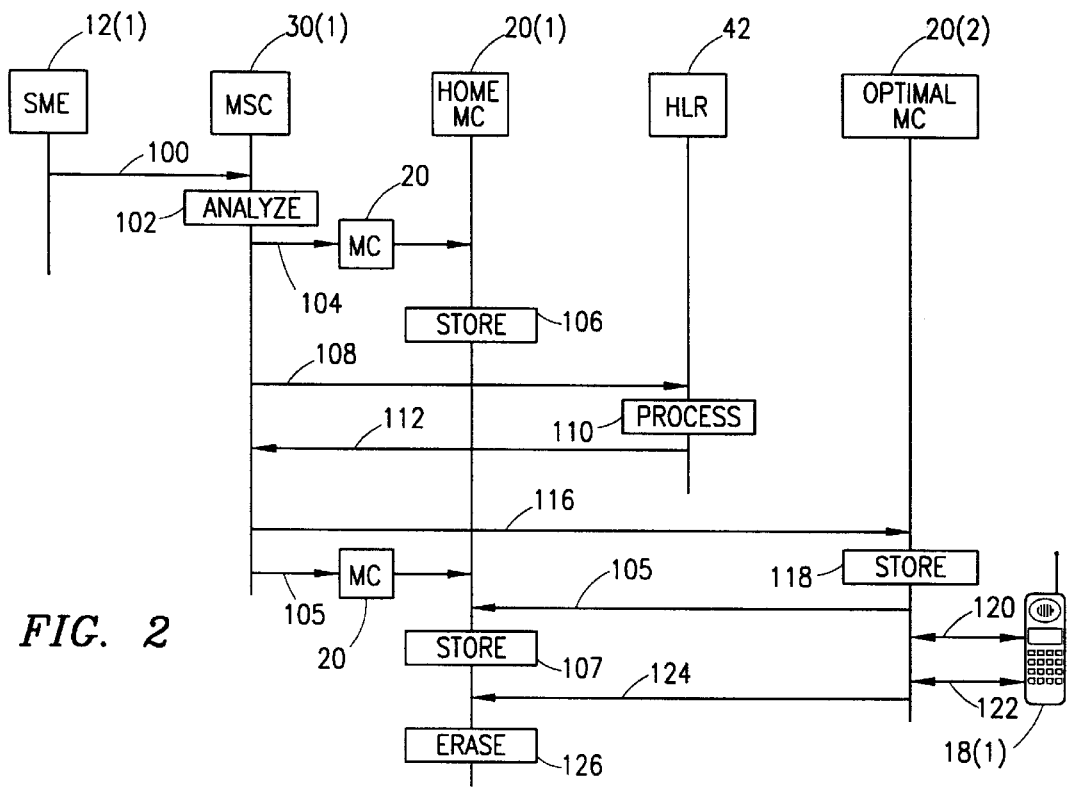
FIG. 2 is a message flow and nodal operation diagram illustrating the handling of subscriber data messages in a message center distributed network architecture and topology.

Reference is now made, in combination with FIG. 1, to FIG. 2 wherein there is shown a message flow and nodal operation diagram illustrating the handling of subscriber data messages in a message center distributed network architecture and topology. A subscriber data message 100 is generated by an addressor message entity 12(1) and received by a (gateway or originating) mobile switching center 30(1) of the cellular telephone network. The mobile switching center 30(1) analyzes the addressee information for the subscriber data message 100 in action 102, and using an appropriate address look-up mechanism/process, identifies a "home" message center 20(1) associated with an addressee subscriber mobile station 18(1) that is the destination of the subscriber data message.

In accordance with known prior art message handling procedures, the received subscriber data message 100 is forwarded 104 to the identified "home" message center 20(1) for the addressee subscriber mobile station 18(1) through a message center 20 associated with the short message entity 12(1) and stored (action 106). By "home" it is meant that message center 20(1) assigned to and maintained by a service provider to which the addressee subscriber mobile station 18(1) has subscribed for telephone service. Storage 106 in the home message center 20(1) provides a back-up copy of the message 100 in the event it is later needed. This procedure for backing-up the subscriber data message 100 in the home message center 20(1) is, however, optional in accordance with the present invention.

Contrary to conventional practice, no attempt is made by the home message center 20(1) in the present invention to deliver (for example, forward) the stored message to the addressee subscriber mobile station 18(1). The reason for this is that the home message center 20(1) recognizes, either from an indication supplied by the mobile switching center 30(1) in the message forward 104, or by querying the home location register 42 (not shown), that another, optimally positioned, message center has also been sent the message for attempted delivery.

In accordance with a distributed architecture and topology implemented in connection with the present invention, the mobile switching center 30(1) further queries 108 the identified home location register 42 for the current location of the addressee subscriber mobile station 18(1). The home location register 42 processes the query 108 in action 110 to identify the current location and identify an optimally positioned message center 20(2) based on location, and then returns 112 pointer information for that optimal message center back to the mobile switching center 30(1). This optimally positioned message center 20(2) may comprise that message center which is most proximate to the current location of the addressee subscriber mobile station 18(1). Using the returned pointer information, the mobile switching center 30(1) then forwards 116 the message 100 to the identified message center 20(2) proximate to the addressee subscriber mobile station 18(1) for storage (action 118). It is based on this identification of an optimal message center 20(2) that the mobile switching center 30(1) may provide the indication to the home message center 20(1) (referenced above in the forward 104) not to attempt delivery. Following storage 118 of the forwarded 116 subscriber data message 100, conventional forwarding 120 procedures well known to those skilled in the art are implemented to effectuate message delivery to the addressee subscriber mobile station 18(1). As an alternative, appropriate conventional retrieval 122 procedures may also be supported for message delivery.

As an alternative to actually backing-up (see, message 104 and action 106) the message 100 in the home message center 20(1), the mobile switching center 30(1) may instead signal 105 the home message center (through message center 20) with data relating to the subscriber data message 100. This data, which does not comprise the message 100 itself, is then stored by the home message center 20(1) in action 107. The data in signal 105 specifies not only the type of subscriber data message 100 that was received, but also identifies the optimal message center 20(2) to which the message was forwarded 116 for storage 118 and attempted delivery (120 or 122). Other data specific and tailored to the received subscriber data message may also be stored. For example, for a facsimile message, the number of pages in the facsimile, time of receipt, and party identifications may be noted. For a voice mail message, calling party identification and time of call may be noted. As a further alternative to origination from the mobile switching center 30(1), the signal 105 may instead be generated at and sent from the optimal message center 20(2) to the home message center 20(1), followed by data storage 107.

If the delivery 120 or 122 is successful, a message 124 indicative of such is sent to the home message center 20(1) so that the previously stored 106 message, or previously stored 107 message data, may be erased (action 126). This message 124 may further provide the home message center 20(1) with charging information relating to the store and forward/retrieve operation effectuated for message delivery.

Figure 3:
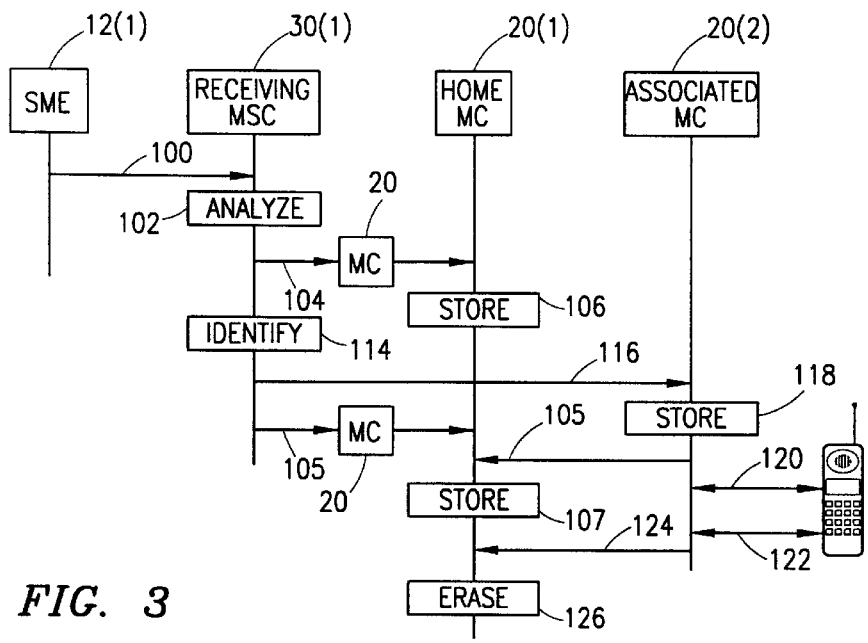
FIG. 3 is a message flow and nodal operation diagram illustrating an alternative embodiment handling of subscriber data messages in a message center distributed network architecture and topology.

Reference is now made, in combination with FIG. 1, to FIG. 3 wherein there is shown a message flow and nodal operation diagram illustrating an alternative embodiment handling of subscriber data messages in a message center distributed network architecture and topology. A subscriber data message 100 is generated by an addressor message entity 12(1) and received by a receiving mobile switching center 30(1) of the cellular telephone network. The mobile switching center 30(1) analyzes the addressee information for the subscriber data message 100 in action 102, and using an appropriate look-up mechanism/process, identifies a home location register 42 associated with an addressee subscriber mobile station 18(1) that is the destination of the subscriber data message.

In accordance with known prior art message handling procedures, the received subscriber data message 100 is forwarded 104 to the identified "home" message center 20(1) for the addressee subscriber mobile station 18(1) through a message center 20 associated with the short message entity 12 (1) and stored (action 106). By "home" it is meant that message center 20(1) assigned to and maintained by a service provider to which the addressee subscriber mobile station 18(1) has subscripted for telephone service. Storage 106 in the home message center 20(1) provides a back-up copy of the message 100 in the event it is later needed. This procedure for backing-up the subscriber data message 100 in the home message center 20(1) is, however, optional.

Contrary to conventional practice, no attempt is made by the home message center 20(1) in the present invention to deliver (for example, forward) the stored message to the addressee subscriber mobile station 18(1). The reason for this is that the home message center 20(1) recognizes, either from an indication supplied by the mobile switching center 30(1) in the message forward 104, or by querying the home location register 42 (not shown), that another, optimally positioned, message center has also been sent the message for attempted delivery.

In accordance with a distributed architecture and topology implemented in connection with the present invention, the receiving mobile switching center 30(1) identifies in action 114 through an appropriate look-up mechanism or process a message center 20(2) that is associated with the receiving mobile switching center. The received subscriber data message 100 is then forwarded 116 to the identified message center 20(2) associated with the receiving mobile switching center 30(1) and stored (action 118). It is based on this identification of the associated message center 20(2) that the receiving mobile switching center 30(1) may provide the indication to the home message center 20(1) (referenced above in the forward 104) not to attempt delivery. Following storage 118 of the forwarded 116 subscriber data message 100, conventional forwarding 120 procedures well known to those skilled in the art are implemented to effectuate message delivery to the addressee subscriber mobile station 18(1). As an alternative, appropriate conventional retrieval 122 procedures may also be supported for message delivery.

As an alternative to actually backing-up (see, message 104 and action 106) the message 100 in the home message center 20(1), the mobile switching center 30(1) may instead signal 105 the home message center (through message center 20) with data relating to the subscriber data message 100. This data, which does not comprise the message 100 itself, is then stored by the home message center 20(1) in action 107. The data in signal 105 specifies not only the type of subscriber data message 100 that was received, but also identifies the associated message center 20(2) to which the message was forwarded 116 for storage 118 and attempted delivery (120 or 122). Other data specific and tailored to the received subscriber data message may also be stored. For example, for a facsimile message, the number of pages in the facsimile, time of receipt, and party identifications may be noted. For a voice mail message, calling party identification and time of call may be noted. As a further alternative to origination from the mobile switching center 30(1), the signal 105 may instead be generated at and sent from the associated message center 20(2) to the home message center 20(1), followed by data storage 107.

If the delivery 120 or 122 is successful, a message 124 indicative of such is sent to the home message center 20(1) so that the previously stored 106 message, or previously stored 107 message data, may be erased (action 126). This message 124 may further provide the home message center 20(1) with charging information relating to the store and forward/retrieve operation effectuated for message delivery.

Figure 4:
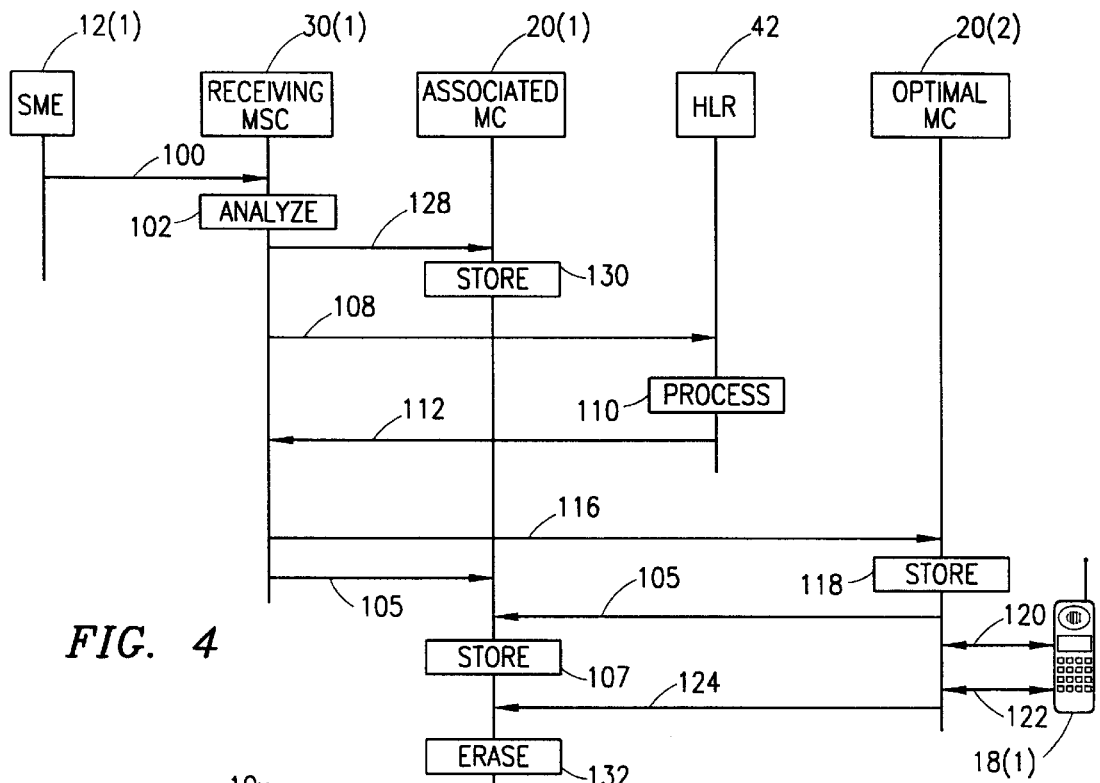
FIG. 4 is a message flow and nodal operation diagram illustrating yet another alternative embodiment handling of subscriber data messages in a message center distributed network architecture and topology.

Reference is now made, in combination with FIG. 1, to FIG. 4 wherein there is shown a message flow and nodal operation diagram illustrating yet another alternative embodiment handling of subscriber data messages in a message center distributed network architecture and topology. A subscriber data message 100 is generated by an addressor message entity 12(1) and received by a receiving mobile switching center 30(1) of the cellular telephone network. The receiving mobile switching center 30(1) analyzes the addressee information for the subscriber data message 100 in action 102, and using an appropriate look-up mechanism/process, identifies a home location register 42 associated with an addressee subscriber mobile station 18(1) that is the destination of the subscriber data message, and further identifies a message center 20(1) that is associated with the receiving mobile switching center.

The received subscriber data message 100 is then forwarded 128 to the identified message center 20(1) associated with the receiving mobile switching center 30(1) and stored (action 130). Storage 106 in the home message center 20(1) provides a back-up copy of the message 100 in the event it is later needed. This procedure for backing-up the subscriber data message 100 in the home message center 20(1) is, however, optional.

No attempt is made by the associated message center 20(1) to deliver (through either forward or retrieve) the stored message to the addressee subscriber mobile station 18(1). The reason for this is that the associated message center 20(1) recognizes, either from an indication supplied by the receiving mobile switching center 30(1) in the message forward 104, or by querying the home location register 42 (not shown), that another, optimally positioned, message center has also been sent the message for attempted delivery.

In accordance with a distributed architecture and topology implemented in connection with the present invention, the mobile switching center 30(1) further queries 108 the identified home location register 42 for the current location of the addressee subscriber mobile station 18(1). The home location register 42 processes the query 108 in action 110 to identify the current location and identify an optimally positioned message center 20(2), and then returns 112 pointer information for that optimal message center back to the mobile switching center 30(1). This optimally positioned message center 20(2) may comprise that message center which is most proximate to the current location of the addressee subscriber mobile station 18(1). Using the returned pointer information, the mobile switching center 30(1) then forwards 116 the message 100 to the identified message center 20(2) proximate to the addressee subscriber mobile station 18(1) for storage (action 118). It is based on this identification of an optimal message center 20(2) that the mobile switching center 30(1) may provide the indication to the home message center 20(1) (referenced above in the forward 104) not to attempt delivery. Following storage 118 of the forwarded 116 subscriber data message 100, conventional forwarding 120 procedures well known to those skilled in the art are implemented to effectuate message delivery to the addressee subscriber mobile station 18(1). As an alternative, appropriate conventional retrieval 122 procedures may also be supported for message delivery.

As an alternative to actually backing-up (see, message 128 and action 130) the message 100 in the associated message center 20(1), the mobile switching center 30(1) may instead signal 105 the associated message center with data relating to the subscriber data message 100. This data, which does not comprise the message 100 itself, is then stored by the associated message center 20(1) in action 107. The data in signal 105 specifies not only the type of subscriber data message 100 that was received, but also identifies the optimal message center 20(2) to which the message was forwarded 116 for storage 118 and attempted delivery (120 or 122). Other data specific and tailored to the received subscriber data message may also be stored. For example, for a facsimile message, the number of pages in the facsimile, time of receipt, and party identifications may be noted. For a voice mail message, calling party identification and time of call may be noted. As a further alternative to origination from the mobile switching center 30(1), the signal 105 may instead be generated at and sent from the optimal message center 20(2) to the associated message center 20(1), followed by data storage 107.

If the delivery 120 or 122 is successful, a message 124 indicative of such is sent to the associated message center 20(1) so that the previously stored 130 message, or previously stored 107 message data, may be erased (action 132). This message 124 may further provide the associated message center 20(1) with charging information relating to the store and forward/retrieve operation effectuated for message delivery.

With respect to FIGS. 2, 3 and 4, different types of network transport connections may be utilized in order to implement the various recited message forwarding (104, 105, 116 or 128) or delivery (120 or 122) actions. For example, if the subscriber data message comprises a short message service (SMS) data message, excess capacity in the Signaling System No. 7 (SS7) network (not shown explicitly in FIG. 1) is used for message transport within the network, and a control signaling channel is used on the air interface for communication with the addressee mobile station 18(1). Similar transport could be effectuated for electronic mail type data messages. If the subscriber data message instead comprises a facsimile data message, a circuit switched connection (not shown explicitly in FIG. 1) is used for message transport within the network, and a traffic channel is used on the air interface for communication with the addressee mobile station 18(1). Similar transport could be effectuated for voice mail type data messages. The network service provider and/or subscriber may specify whether the charges for use of the network transport resources are to be billed to the addressor message entity 12(1) or the addressee subscriber mobile station 18(1).

2. Mailbox Portability

Reference is now once again made to FIG. 1. Each message entity 12 is associated with both a "home" message center 20 of the home service area within the cellular telephone network 10h and a mailbox 46 maintained within that message center. It is in this mailbox 46 that subscriber data messages sent by or sent to the particular message entity 12 are stored. Mobile stations 18 are message entities 12 capable of movement. In most cases, movement of the mobile station, for example within its own home cellular telephone network 10h, does not present any particular difficulties with respect to the maintenance of the mailbox 46 and the sending or delivery of stored subscriber data messages.

Movement comprising roaming within a visited cellular telephone network 10v, on the other hand, does present some problems. While roaming within the visited cellular telephone network 10v, subscriber data messages for a given subscriber mobile station 18 continue to be saved in the home message center 20. In order to retrieve these messages, the mobile station 18 must make contact with the home message center 20. If delivery (forwarding or retrieval) of the stored subscriber data messages requires use of a circuit connection (such as with facsimile or voice mail messages), long distance calling charges are incurred.

In accordance with the present invention, the roaming subscriber establishes a local mailbox 46' in a proximate message center 20 associated with the visited cellular telephone network 10v. The stored contents of the home mailbox 46 associated with the home cellular telephone network 10h are then transferred over a connecting network 50 for storage in the local mailbox 46'. Any subsequently received subscriber data messages are similarly transferred from the home mailbox 46 to the local mailbox 46' over the connecting network 50. Charges for effectuating the transfer of stored data over the network 50 are borne by the roaming subscriber. An appropriate announcement and acceptance procedure is implemented to confirm charging and allow for transport network selection. Furthermore, where appropriate, subscriber data messages destined for storage in the home mailbox 46 are intercepted by a mobile switching center 30 in the home cellular telephone network 10h, and redirected to the local mailbox 46' for storage. In these instances, charges for effectuating the redirection are borne by the party sending/leaving the subscriber data message for the roaming subscriber. Again, an appropriate announcement and acceptance procedure is implemented to confirm charging and allow for transport network selection.

The type of connecting network 50 used for effectuating the transfer or redirection of the subscriber data messages differs depending on the type of message traffic at issue. For example, for short message service (SMS) messages, or perhaps electronic mail messages, excess capacity on the Signaling System No. 7 (SS7) network may be used. Other types of transport networks, such as a cellular digital packet data (CDPD), X.25, asynchronous transfer mode (ATM), integrated service digital network (ISDN), public switched telephone network (PSTN), internet (TCP/IP) or the like network, may also be used for the transfers and redirections implicating more intensive data transmission or circuit connection requiring transactions.

Figure 5:
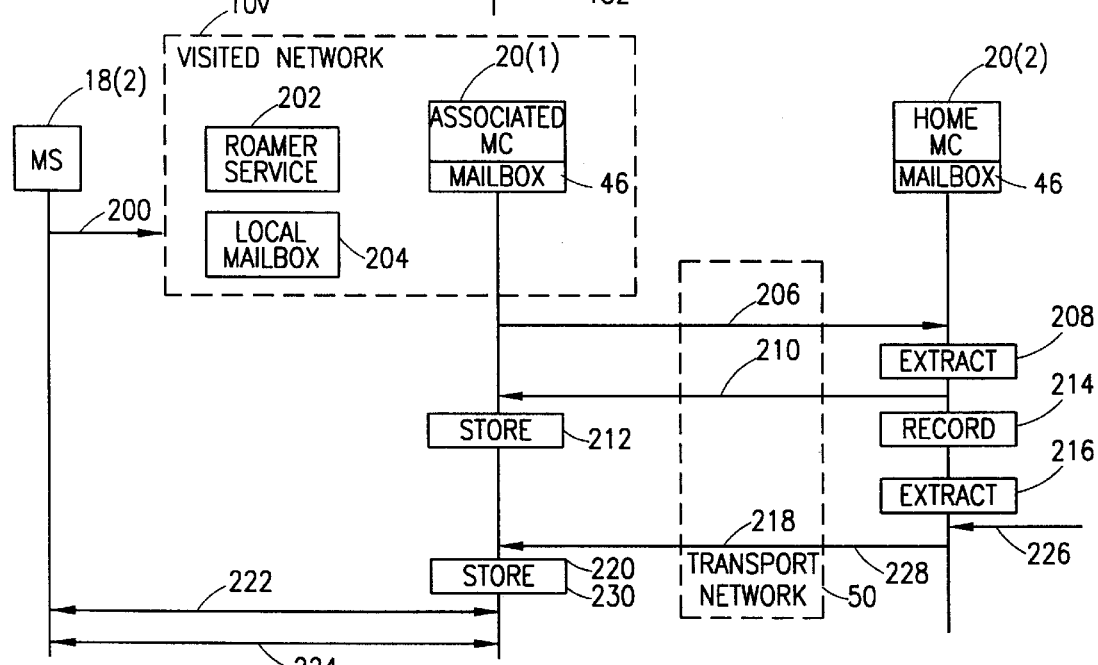
FIG. 5 is a message flow and nodal operation diagram illustrating mailbox portability within the cellular telephone network of FIG. 1.

Reference is now made, in combination with FIG. 1, to FIG. 5 wherein there is shown a message flow and nodal operation diagram illustrating mailbox portability within the cellular telephone network of FIG. 1. When a roaming subscriber mobile station 18(2) initially registers 200 within a visited cellular telephone network 10v, the network, in conjunction with defining a service profile for and connecting a roamer directory number to the roaming mobile station (action 202), further defines and establishes (action 204) a local mailbox 46' for that subscriber in an associated message center 20(1). Following such initial definition and establishment, the associated message center 20(1) uses the network 50 to contact 206 a home message center 20(2) for that subscriber mobile station 18(2). Responsive to the contact 206, the home message center extracts any subscriber data messages stored in the mailbox 46 (action 208). These extracted messages are then transmitted 210 back over the network 50 to the associated message center 20(1), and stored (action 212) in the local mailbox 46'. A record 214 is kept by the home message center 20(2) of the current location of the mailbox 46' for the roaming subscriber mobile station 18(2). Any subsequently received mailbox 46 stored subscriber data messages may thereafter be periodically extracted 216 (for example, through polling) from the mailbox 46, transmitted 218 over the network to the associated message center 20(2), and stored 220 in the local mailbox 46'. Alternatively, the home location register 20 (see, FIG. 1) stores information pointing to the current location of the mailbox 46' for the roaming subscriber mobile station 18(2). Any subsequently received subscriber data messages are then re-directed 218 over the network following home location register querying to the associated message center 20(2), and stored 220 in the local mailbox 46'. Once stored in the local mailbox 46', conventional forwarding 222 or retrieval 224 procedures well known to those skilled in the art (such as short message service (SMS) delivery, voice mail, large file delivery, and the like) are implemented to effectuate message delivery to the addressee roaming subscriber mobile station 18(2).

It will be understood that the transmission 210 or 218 of each stored subscriber data message over the network 50 may require the use of one or more different types of networks tailored for the specific type of message being sent. For example, one type of subscriber data message, such as a voice mail or facsimile message, may be sent over a circuit connection through an integrated service digital network (ISDN) or public switched telephone network (PSTN). Another type of subscriber data message, such as a short message service or electronic mail message, may be sent over a connection-less transport using a Signaling System No. 7 (SS7), internet (TCP/IP), cellular digital packet data (CDPD), X.25, or asynchronous transfer mode (ATM) network. The contact 206 accordingly includes, and the record 214 accordingly stores, addressing information which would enable the home message center 20(2) to address communications transmissions 210 and 218 (comprising the extracted subscriber data messages) over a selected appropriate one of the various types of networks supported by the network 50 for message delivery to the associated message center 20(1).

The addressing information stored in the record 214 is further made available to a serving mobile switching center 30 in those instances where an addressor message entity desires to leave a message 226 for (or send a message to) the roaming subscriber mobile station. With the addressing information, and responsive to addressor approval for a transfer, the serving mobile switching center may route 228 the data service message 226, which conventionally would have been stored in the mailbox 46 of the home message center 20(2), instead through the network 50 to the associated message center 20(1) for storage 230 in the local mailbox 46'. Charges for this transmission 228 are, from the perspective of the roaming subscriber mobile station 18(2), advantageously borne by the addressor. For this implementation, either the home message center 20(2) or the originating (gateway) mobile switching center 30 provides the prompting announcement to the addressor, and collects a confirmation concerning charging and perhaps transport network selection.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for handling storage of subscriber data messages within a cellular telephone network including a home message center and a home location register for an addressee message entity, the network further including another message center, a first switching node and a second switching node, the second switching node serving the addressee message entity, comprising the steps of:

receiving a subscriber data message transmitted to the addressee message entity at the first switching node;

forwarding the received subscriber data message from the first switching node, not to the home message center associated with the addressee message entity, but instead to the other message center;

storing the forwarded subscriber data message in the other message center; and delivering the stored subscriber data message to the addressee message entity from the other message center through the second switching node.

2. The method as in claim 1 wherein the other message center comprises a message center assigned to the first switching node of the cellular telephone network which initially received the subscriber data message transmitted to the addressee message entity.

3. The method as in claim 2 further including the step of sending a notification of subscriber data message forwarding to the home message center, the notification sent from the first switching node.

4. The method as in claim 2 further including the step of sending a notification of subscriber data message forwarding to the home message center, the notification sent from the other message center.

5. The method as in claim 1 wherein the other message center comprises a message center proximate to a current location within the cellular telephone network of the addressee message entity.

6. The method as in claim 5 further comprising the steps of:

querying a location database to determine an approximate location of the addressee message entity; and processing the approximate location to identify the proximate message center.

7. The method as in claim 5 further including the step of sending a notification of subscriber data message forwarding to the home message center, the notification sent by the proximate message center.

8. The method as in claim 1 further including the step of sending a notification of subscriber data message forwarding to the home message center, the notification sent by a switching node of the cellular telephone network which initially received the subscriber data message transmitted to the addressee message entity and forwarded the subscriber data message to the other message center.

9. The method as in claim 1 wherein the addressee message entity comprises a roaming subscriber mobile station.

10. The method as in claim 1 wherein the cellular telephone network includes a first service network containing the home message center and a second service network containing the other message center.

11. A wireless telephone network, comprising:
a home location register;
a first switching node serving an addressee message entity;
a first message center assigned to a service provider to which an addressee message entity has subscripted for telephone service;
a second message center; and
a second switching node having connection capability with both the first and the second message center, the second switching node receiving a subscriber data message addressed to the addressee message entity and operating to forward the received subscriber data message not to the first message center but instead to the second message center.

12. The network as in claim 11 wherein the second message center is assigned to a service provider providing telephone service through the second switching node.

13. The network as in claim 11 wherein the addressee message entity comprises a subscriber mobile station.

14. The network as in claim 11 wherein the first message center comprises a home message center for the addressee message entity.

15. The network as in claim 11 wherein the second switching node further operates to notify the first message center of the forwarding of the subscriber data message to the second message center.

16. The network as in claim 11 wherein the second message center operates to effectuate delivery of the forwarded subscriber data message to the addressee message entity through the first switching node.

17. The network as in claim 11 wherein the second message center operates to notify the first message center of the forwarding of the subscriber data message to the second message center.

18. The network as in claim 11 wherein the second message center is proximately located to a current location of the addressee message entity.

19. The network as in claim 11 wherein the wireless telephone network comprises a first service network containing the first message center and a second service network containing the second message center.

20. A method for handling storage of subscriber data messages in a cellular telephone network, wherein the network comprises:
a home network for an addressee message entity, the home network including a home location register storing addressee message entity related information and a home message center operating to store and forward subscriber data messages; and
another network including a message center operating to store and forward subscriber data messages; and
the method comprising the steps of:
receiving a subscriber data message transmitted to that addressee message entity;
forwarding the received subscriber data message, not to the home message center associated with the addressee message entity in the home network for the purpose of storage and delivery to the addressee message entity, but instead to the message center in the another network;
storing the forwarded subscriber data message in the message center for the another network; and
delivering the stored subscriber data message to the addressee message entity from the message center in the another network.

21. The method as in claim 20 wherein the step of receiving comprises the step of receiving the subscriber data message in that another network from an addressor message entity.

22. The method as in claim 21 further including the step of sending a notification concerning the forwarding of the subscriber data message to the message center in the another network, that notification being sent from the another network to the home message center in the home network.

23. The method as in claim 22 wherein the notification is sent from the message center in the another network.

24. The method as in claim 20 wherein the another network comprises a visited network where the addressee message entity is currently located, and the message center in the another network comprises a message center proximate to a current location of the addressee message entity.

25. The method as in claim 24 further comprising the steps of:
querying the home location register in the home network to determine an approximate location of the addressee message entity; and
processing the approximate location to identify the message center in the visited network.

26. The method as in claim 24 further including the step of sending a notification concerning the forwarding of the subscriber data message to the message center in the another network, that notification being sent from the visited network to the home message center in the home network.

27. The method as in claim 20 further including the step of notifying the home message center that the subscriber data message for the addressee message entity has been forwarded to and stored in the message center for the another network.

28. The method as in claim 20 further including the step of storing the subscriber data message in the home message center of the home network to backup the storage made in the message center of the another network.

29. A wireless telephone network, comprising:
(a) a home network for an addressee message entity, comprising:
a home location register storing addressee message entity related information; and
a home message center operating to store and forward subscriber data messages;
(b) another network, comprising:
a message center operating to store and forward subscriber data messages; and
(c) a switching node having connection capability with both the home message center and the message center in the another network, the switching node receiving a subscriber data message addressed to the addressee message entity and operating to forward the received subscriber data message not to the home message center associated with the addressee message entity in the home network for the purpose of storage and delivery to the addressee message entity, but instead to the message center in the another network for the purpose of storage and delivery to the addressee message entity.

30. The network as in claim 29 wherein the switching node is located in the another network to receive the subscriber data message from an addressor message entity.

31. The network as in claim 29 wherein the switching node is located in the home network.

32. The network as in claim 29 wherein the another network comprises a visited network where the addressee message entity is currently located and the message center in the another network is proximately located to a current location of the addressee message entity.

33. The network as in claim 29 wherein the addressee message entity comprises a subscriber mobile station.

34. The network as in claim 29 wherein the switching node further operates to notify the home message center that the subscriber data message for the addressee message entity has been forwarded to and stored in the message center for the another network.

35. The network as in claim 29 wherein the message center in the another network operates to notify the home message center that the subscriber data message for the addressee message entity has been forwarded to and stored in the message center for the another network.

36. The network as in claim 29 wherein the switching node further stores the subscriber data message in the home message center of the home network to backup the storage made in the message center of the another network.

* * * * *